2 Sheets—Sheet 1.
H. C. SERGEANT.
STEAM ACTUATED VALVE.
No. 10,682. Reissued Feb. 2, 1886.
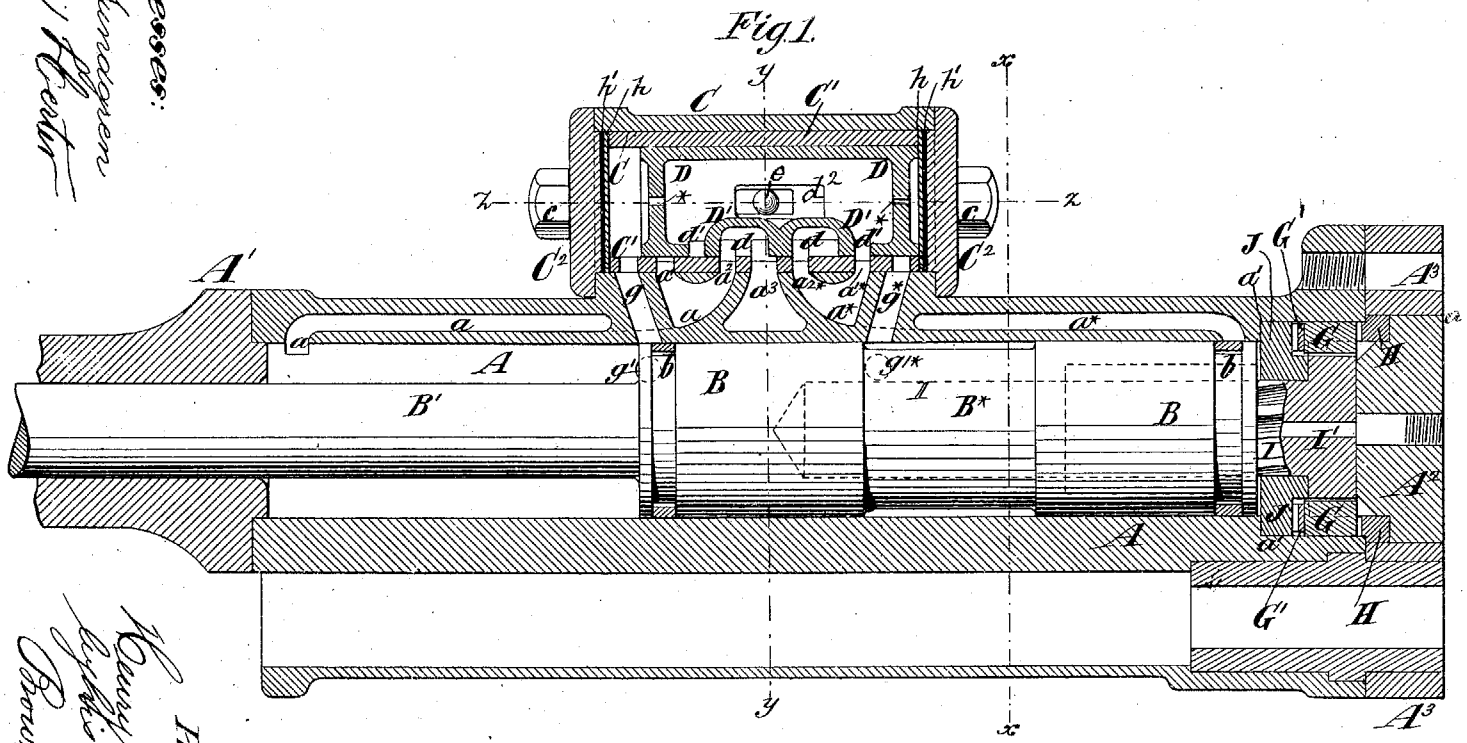
Witnesses:
C. L. Sundgren
Emil Herter
Inventor:
Henry C. Sergeant
by his Attys
Brown & Hall
THE NORRIS PETERS CO., WASHINGTON, D. C.

H. C. SERGEANT.

STEAM ACTUATED VALVE.

No. 10,682. Reissued Feb. 2, 1886.

Witnesses:

C. A. Sundgren

Emil Herter

Inventor

Henry C. Sergeant by his attys

Brown & Hall

THE NORRIS PETERS CO., WASHINGTON, D. C.

UNITED STATES PATENT OFFICE.

HENRY C. SERGEANT, OF NEW YORK, N. Y.

STEAM-ACTUATED VALVE.

SPECIFICATION forming part of Reissued Letters Patent No. 10,682, dated February 2, 1886.

Original No. 330,968, dated November 10, 1885. Application for reissue filed December 12, 1885. Serial No. 185,499.

*To all whom it may concern:*

Be it known that I, HENRY C. SERGEANT, of the city and county of New York, in the State of New York, have invented a new and useful Improvement in Steam-Actuated Valves for Direct-Acting Engines, of which the following is a specification.

My invention relates to fluid-actuated valves—such, for example, as those shown in my Letters Patent No. 91,675, dated June 22, 1869, and No. 202,060, dated April 2, 1878. In both these patents is employed a piston-valve or slide-valve having connected with it an auxiliary piston or pistons and operating in a cylindric valve-chest or auxiliary cylinder, to control the admission of motive fluid to the opposite ends alternately of the main cylinder and the exhaust of motive fluid from the ends of such main cylinder after it has performed its work of reciprocating the piston therein. In both said patents the main piston, by its longitudinal reciprocation in the cylinder, places the ends of the auxiliary or valve cylinder alternately in communication with the main exhaust port or passage, and when this is done the pressure of motive fluid in the opposite end of said auxiliary cylinder acts upon the auxiliary piston therein and moves the said piston and the main valve, so as to produce the return-stroke of the main piston within the main cylinder.

My present invention consists in the novel construction of the several parts of an engine having such valve mechanism, and in a novel manner of combining said parts together, as hereinafter more fully described, and pointed out in the claims.

Figure 3:
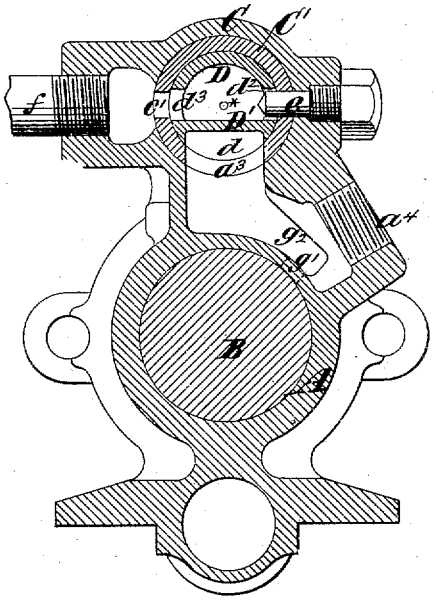
Figure 2:
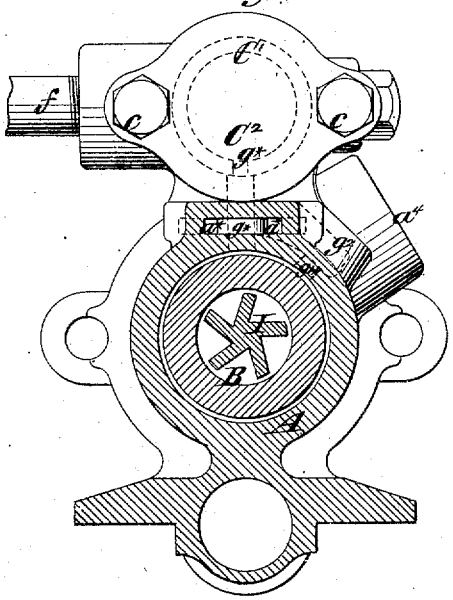
Figure 4:
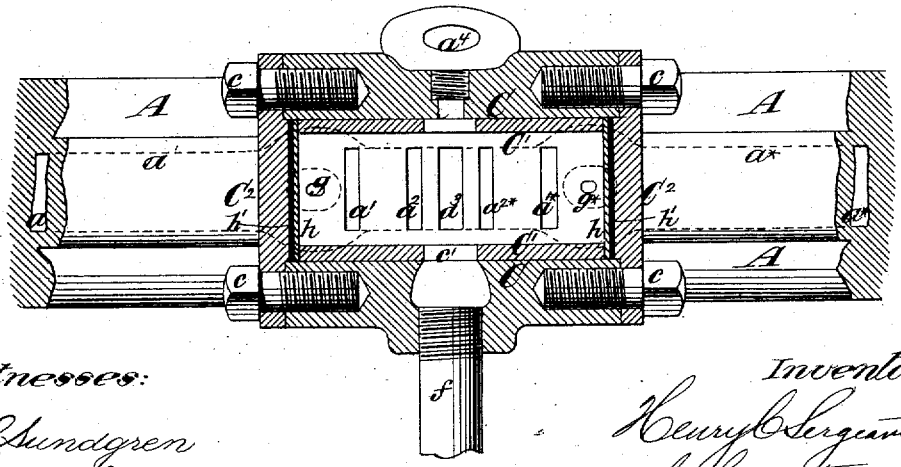

In the accompanying drawings, Figure 1 represents a longitudinal section of such parts of a rock-drill as are necessary to illustrate my invention. Fig. 2 represents a transverse section on the plane of the dotted line *x x*, Fig. 1. Fig. 3 represents a similar section on the plane of the dotted line *y y*, Fig. 1; and Fig. 4 represents a horizontal section of the auxiliary cylinder and valve-chest on the plane of the dotted line *z z*, Fig. 1, including a plan of a portion of the main cylinder, the main valve and auxiliary piston being removed in order to illustrate more clearly the ports and passages whereby the admission of steam to and its exhaust from the main cylinder are controlled.

Similar letters of reference designate corresponding parts in all the figures.

A designates the main cylinder of a rock-drill, and B designates a piston fitted to move therein, and provided with suitable packing, *b*, to prevent leakage. At the lower end the cylinder is closed by a head, A′, and at the upper end is fitted a head, $A^2$, which may consist of a cylindric piece of metal fitting within a ring or plate, $A^3$, having a circular bore, *a*, for the head. The head $A^2$ may be held in place by spring-pressure, as shown in my application for Letters Patent, Serial No. 157,445, filed March 2, 1885. The piston B has a rod, B′, to which the drill or bit may be secured, and the piston is rotated by mechanism similar to that shown in my aforesaid application, or by any other suitable mechanism. This mechanism for rotating the piston and drill forms no part of my present invention, and but little description thereof will be necessary. The cylinder A is rabbeted or counterbored to form a shoulder, *a′*, and upon this shoulder is fitted a ring or flange, J.

I designates a spiral bar, which is received within a cavity in the piston and fits a nut therein, and which passes through the ring or flange J. The head I′ of this bar is locked to a ring, G, which is supported by a spring, G′, interposed between it and the ring J; and H designates a second ring, which is here shown as clamped and held by friction between the head $A^2$ and the end of the cylinder. The rings G H are provided on their adjacent faces with ratchet-shaped teeth, which engage with each other, and as the piston is moved downward or makes its working-stroke the ring G turns upon the ring H, the spring G′ permitting the ring G to yield in order that its teeth may pass the teeth of the ring H. On the up or return stroke of the piston, however, the teeth of the ring G interlock with the teeth of the ring H, and by holding the spiral bar I′ against turning produces the turning of the piston. I have employed the same letters to designate these parts as are used in my aforesaid application, and no further description thereof is necessary. In lieu of this combination of mechanism for rotating the piston and drill, any other suitable rotating device may be employed.

C designates an auxiliary cylinder and valve-chest, which, as here shown, is made in the same casting as the main cylinder A. I have here represented the cylinder C as provided with a removable lining or bushing, C′, and closed at the ends by heads $C^2$, secured in place by bolts *c*.

D designates the auxiliary piston, which is fitted to reciprocate within the auxiliary cylinder C or within the removable lining C′ therein, and which has formed in it by casting the main valve D′. This main valve is a double D-valve with cavities or coves *d* cast within it, and has at opposite ends of such cavities or coves apertures or ports *d*′.

The cylinder is provided with passages *a a**, leading from its opposite ends to the valve-chest C, and communicating therewith by ports or apertures $a'$ $a^2$ $a'$* $a^{2}$*. Between the ports or apertures $a^2$ $a^{2}$* is the main exhaust port or cavity $a^3$, which communicates with the atmosphere at $a^4$, as shown in Fig. 3. I have here shown a screw, *e*, which is inserted in the side of the auxiliary cylinder C, and the end of which projects through the lining C′ and enters a slot, $d^2$, cut in the auxiliary piston, as best shown in Fig. 3. This slot-and-pin connection permits of the auxiliary piston D being freely reciprocated, and at the same time prevents its turning, so that the coves or cavities will at all times register with the several ports in the lining C′. At the opposite side of the auxiliary cylinder C, I have represented a supply-pipe, *f*, and in the lining C′ and auxiliary piston D are slots or passages $c'$ $d^3$, which register with each other, and through which the steam or other motive fluid enters freely the interior of the auxiliary piston D. The slot $d^3$ is made of sufficient length so that the interior of the auxiliary piston D will be at all times in free communication with the supply *f* of motive fluid.

I have also shown the cylinder A as provided with small ports *g g**, leading therefrom to and through the lining C′ of the auxiliary cylinder C, and in the same planes transversely of the cylinder as the ports *g g** are other ports, *g*′ *g*′*, which communicate through passages or cavities $g^2$ with the main exhaust, as best shown in Fig. 3. The ports or passages *g g** are formed in posts or bridges, which extend directly across the passages *a a**, and the latter passages are at these points widened out, so as to afford ample space for the passage of motive fluid around such posts or bridges. The several ports *g a*′ $a^2$ $a^3$ $a^{2}$* *a*′* *g** are formed by coring out the cylinder structure, and will not have clearly-defined edges; but such ports, or continuations thereof, are accurately formed or cut in the lining C′, and are there properly spaced for the main valve and auxiliary piston to work upon. After being provided with these holes the lining C′ is slipped into place in the auxiliary cylinder C and secured therein by the heads $C^2$. I have here shown at each end of the auxiliary cylinder a packing, which consists of a thin metal plate, *h*, and a sheet of rubber packing, *h*′, resting thereon and interposed between such metal plate and the head $C^2$.

In the ends of the auxiliary piston D, I have represented holes *, through which motive fluid may pass from the interior of the piston to the ends of the auxiliary cylinder C and the hole * in the left-hand end of the auxiliary piston (shown in Fig. 1) is larger than the hole * in the other end thereof, for a purpose hereinafter described. The holes * in the ends of the auxiliary piston D are not indispensable, for the leakage of the motive fluid between the piston and the lining C′ at the supply-slots *c*′ $d^3$ will be sufficient to supply motive fluid to the ends of the valve-chest and cylinder C.

In the piston B, I have represented a portion, B*, of reduced diameter, and it will be clearly seen that when such portion of reduced diameter comes opposite either of the passages *g g** such passage will be placed in communication with the companion passage, *g*′ or *g*′*, which leads to the main exhaust $a^3$.

As represented in the drawings, Fig. 1, the piston is at the right-hand or upper end of its stroke, and the valve D′ and auxiliary piston D have been so shifted that the right-hand port, *d*′, in the valve is opposite the port *a*′* in the cylinder. The motive fluid may then pass freely from the interior of the valve or auxiliary piston, through the ports *d*′ *a*′* and passage *a**, to the upper end of the cylinder, and at the same time motive fluid may exhaust from the lower end of the cylinder, through the passage *a a*′ and cove or cavity *d*, into the main exhaust $a^3$. The motive fluid admitted to the right-hand or upper end of the cylinder will force the piston toward the left, and at the same time motive fluid will have passed through the aperture * in the left-hand end of the auxiliary piston, or between the piston and lining C′, so as to fill the left-hand end of the auxiliary cylinder C. The ports will remain in the position shown until the reduced portion B* in the piston comes opposite the ports *g g*′; but the instant this occurs the left-hand end of the auxiliary cylinder C will by the ports *g g*′ be placed in communication with the main exhaust $a^3$, thereby relieving the left-hand end of the auxiliary piston of pressure, and the motive fluid which has leaked through the aperture in the right-hand end of the piston will thereupon force the auxiliary piston toward the left of Fig. 1 sufficiently to shut off the motive fluid from the passage *a**, and to admit motive fluid through the passage *d*′ *a*′ *a* to the lower end of the cylinder A. While the auxiliary piston D is at rest in either position, motive fluid will pass through the holes or apertures *, or between the piston and lining, and accumulate pressure in opposite ends of the auxiliary cylinder C, and the reduced portion of the piston B* will alternately place said ends of the auxiliary cylinder in free communication with the main exhaust, and when the pressure on either end of the auxiliary piston is thus reduced the pressure on the opposite end of the auxiliary piston will throw it over, as described.

If the holes or openings * in the ends of the auxiliary piston are employed, it is advantageous to have the hole or opening * in the left-hand end of the auxiliary piston larger than that in the right-hand end thereof, because pressure in the left-hand end of the auxiliary cylinder will then, beyond a doubt, be sufficient to force the auxiliary piston toward the right the instant the pressure in the right-hand end of said cylinder is relieved, and hence the liability of the main piston striking the upper head of the main cylinder in making its return or up stroke will be reduced.

Although I have only represented my invention as embodied in a rock-drill, it may be employed with advantage in other direct-acting engines, such as steam-hammers, punching and riveting machines, and direct-acting steam-pumps.

By making a removable and renewable lining, C′, for the auxiliary cylinder C, I provide for easily and cheaply forming the ports on which the valve works so that they will accurately register, and when the valve and lining become worn they may be readily removed and a new valve and lining slipped into place without taking the machine to a repair-shop.

One important feature or element of my invention is the double D-valve having its two exhaust coves or cavities *d* open on the under side of the valve only, and independent of the supply-openings. The pressure of motive fluid within the valve-chest serves to hold such a valve tightly upon its seat, and so prevent leakage of live motive fluid through the exhaust-ports; and the employment of a double D-valve enables me to extend the passages *g g′ g* g′** directly from the valve-chest to the main cylinder, and obviates the necessity of crossing certain of such passages from one end to the other of the valve-chest, as must be done with the valve shown in patent to A. C. Rand, No. 328,612, dated October 20, 1885.

What I claim as my invention, and desire to secure by Letters Patent, is—

1. The combination, with the cylinder and valve-chest, constructed with ports, substantially as described, of the double D-valve working as a piston within the chest, and having its two exhaust coves or cavities open on the under side of the valve only, and the main piston having a circumferential groove, whereby the ends of the valve chest are alternately opened to the exhaust, substantially as herein described.

2. The combination, with the cylinder and valve chest, constructed with ports, substantially as described, of the double D-valve and hollow auxiliary piston, having a supply-slot in its side, through which the motive fluid enters its interior, and the main piston having a circumferential groove, whereby the ends of the valve-chest are alternately opened to the exhaust, substantially as herein set forth.

3. In a direct-acting engine, the combination, with a main cylinder and an auxiliary cylinder, constructed with ports and passages, substantially as herein described, and the auxiliary cylinder having a supply-opening between its ends, of a main piston, whereby the ends of the auxiliary cylinder will alternately be placed in communication with the main exhaust, and the auxiliary piston and main valve comprised in a single hollow structure having a slot in its side, which registers with the supply-opening in the auxiliary cylinder, and through which motive fluid is admitted into the interior of the auxiliary piston and main valve, and having apertures in its ends, through which the motive fluid may pass from the interior of the auxiliary piston and main valve into the opposite ends of the auxiliary cylinder, in order to move the valve when the pressure upon either end of the auxiliary piston is relieved, substantially as herein set forth.

4. In a direct-acting engine, the combination, with a main cylinder and an auxiliary cylinder, constructed with ports and passages, substantially as described, of a lining or bushing fitted to the auxiliary cylinder, and having formed in it ports which correspond with those of the cylinder, a reciprocating main piston serving to place the ends of the auxiliary cylinder alternately in communication with the main exhaust, and an auxiliary piston and main valve consisting of a hollow structure, to the interior of which motive fluid is admitted, and in the ends of which are holes or apertures for the passage of motive fluid to the ends of the auxiliary cylinder, for the purpose of moving the auxiliary piston and main valve, substantially as set forth.

5. In a direct-acting engine, the combination, with a main cylinder and auxiliary cylinder, constructed with ports and passages, substantially as herein described, and a lining having a supply-slot in its side, of a main piston, B, and an auxiliary piston and main valve, D D, forming a single hollow structure, in the side of which is an opening or slot, *d*′, through which motive fluid enters its interior, and in the ends of which are openings *, through which motive fluid passes into the ends of the auxiliary cylinder, substantially as herein set forth.

6. The combination, with the main and auxiliary cylinders A C, constructed with supply and exhaust ports and passages, as described, of the passages *g g**, leading direct from the ends of the auxiliary cylinder C to the main cylinder, and passages *g′ g′**, leading to the exhaust, and arranged in the same planes transversely to the cylinder as the passages *g* *g**, the main piston having a portion of reduced diameter, B*, and the auxiliary piston and main valve D D′ forming a single hollow structure, provided with exhaust coves or cavities *d*, and with ports *d*′, and having in its side a supply-slot, *d*³, for motive fluid, and in its ends holes or apertures *, substantially as herein set forth.

HENRY C. SERGEANT.

Witnesses:

C. HALL,

M. LINDEMAN.